(12) United States Patent
Luckert et al.

(10) Patent No.: US 9,695,297 B2
(45) Date of Patent: Jul. 4, 2017

(54) CURABLE COMPOSITION HAVING COMBINED STABILIZERS

(71) Applicant: Henkel AG & Co. KGaA, Duesseldorf (DE)

(72) Inventors: Jens Luckert, Barsinghausen (DE); Matthias Kohl, Weinheim (DE); Manfred Probster, Nussloch (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/799,968

(22) Filed: Mar. 13, 2013

(65) Prior Publication Data

US 2013/0197141 A1    Aug. 1, 2013

Related U.S. Application Data

(63) Continuation of application No. PCT/EP2012/051529, filed on Jan. 31, 2012.

(30) Foreign Application Priority Data

Feb. 1, 2011  (DE) ................ 10 2011 003 425

(51) Int. Cl.
| | |
|---|---|
| C08K 5/375 | (2006.01) |
| C08K 5/134 | (2006.01) |
| C08G 18/83 | (2006.01) |
| C08K 5/13 | (2006.01) |
| C09K 3/10 | (2006.01) |
| C08L 71/02 | (2006.01) |
| C08L 75/04 | (2006.01) |

(52) U.S. Cl.
CPC ............ C08K 5/375 (2013.01); C08G 18/837 (2013.01); C08K 5/13 (2013.01); C08K 5/134 (2013.01); C09K 3/1006 (2013.01); C08G 2190/00 (2013.01); C08L 71/02 (2013.01); C08L 75/04 (2013.01); C09K 2003/1056 (2013.01)

(58) Field of Classification Search
USPC ................... 524/331, 333, 335, 349
See application file for complete search history.

(56) References Cited

U.S. PATENT DOCUMENTS

| | | | | |
|---|---|---|---|---|
| 4,741,846 A | * | 5/1988 | Evans ............................ | 508/243 |
| 4,857,572 A | * | 8/1989 | Meier ................... | C07C 323/00 508/570 |
| 4,900,772 A | * | 2/1990 | Imanaka et al. .............. | 524/303 |
| 5,342,914 A | * | 8/1994 | Iwakiri ................ | C08G 65/336 525/403 |
| 5,804,253 A | * | 9/1998 | Hagiwara et al. ............ | 427/386 |
| 5,814,691 A | | 9/1998 | Kuhn et al. | |
| 6,077,896 A | * | 6/2000 | Yano ..................... | C08G 65/336 524/308 |
| 2001/0003763 A1 | * | 6/2001 | Nishimura ........... | C08G 65/336 524/490 |
| 2003/0105261 A1 | * | 6/2003 | Komitsu .............. | C08G 65/336 528/10 |
| 2007/0135590 A1 | * | 6/2007 | Kotani et al. ................. | 525/479 |
| 2007/0213459 A1 | | 9/2007 | Tamai et al. | |
| 2008/0033087 A1 | * | 2/2008 | Okamoto et al. ............ | 524/275 |
| 2009/0124765 A1 | | 5/2009 | Kimura et al. | |
| 2009/0264567 A1 | | 10/2009 | Prins et al. | |

FOREIGN PATENT DOCUMENTS

| | | | | |
|---|---|---|---|---|
| CA | 2111415 A1 | * | 6/1994 | ............ C09J 143/04 |
| EP | 1396513 A1 | | 3/2004 | |
| EP | 1535940 A1 | | 6/2005 | |
| EP | 1925628 A1 | | 5/2008 | |
| EP | 1930376 A1 | | 6/2008 | |
| EP | 2053092 A1 | | 4/2009 | |
| JP | H08245849 A | | 9/1996 | |
| JP | H1149970 A | | 2/1999 | |
| JP | 2001310988 A | | 11/2001 | |
| JP | 2008539288 A | | 11/2008 | |
| JP | 2009221387 A | | 10/2009 | |
| JP | 2013139577 A | | 7/2013 | |
| WO | 2005047394 A1 | | 5/2005 | |
| WO | 2005075562 A1 | | 8/2005 | |
| WO | 2005116134 A1 | | 12/2005 | |
| WO | 2008020600 A1 | | 2/2008 | |
| WO | 2008143196 A1 | | 11/2008 | |
| WO | 2010139611 A1 | | 12/2010 | |
| WO | 2012104287 A1 | | 8/2012 | |

OTHER PUBLICATIONS

Salmone et al, Concise Polymeric Materials Encyclopedia, Aug. 28, 1998 p. 23.*
International Search Report for PCT/EP2012/051529, mailed Jun. 11, 2012.

* cited by examiner

*Primary Examiner* — Christopher M Rodd
(74) *Attorney, Agent, or Firm* — James E. Piotrowski

(57) ABSTRACT

The invention aims to improve temperature resistance for a curable composition based on a silyl-terminated polymer. This is achieved by using a combination of at least two phenolic compounds, of which one is free of thioether groups, while the other contains at least one thioether group in at least one alkyl side chain. The invention further relates to the use of the curable composition as an adhesive, sealant and/or coating substance and to the use of the combination of phenolic compounds to increase the temperature stability in curable compositions.

10 Claims, No Drawings

CURABLE COMPOSITION HAVING COMBINED STABILIZERS

The present invention relates to the field of curable compositions, as used for example in adhesives, sealants and coating compositions. In particular, the invention relates to moisture curable compositions based on silane-terminated polymers and proposes the addition of a special combination of substances to improve temperature stability. The invention further relates to the use of the combination of substances to improve the temperature stability of curable compositions and the use of the compositions as an adhesive, sealant and/or coating composition.

One-component, moisture-curing adhesives and sealants have for years played an important part in numerous technical applications. As well as the polyurethane adhesives and sealants with free isocyanate groups and the traditional silicone adhesives and sealants based on dimethylpolysiloxanes, there has recently also been increasing use of so-called silane-modified adhesives and sealants. Compared with polyurethane adhesives and sealants, the silane-modified adhesives and sealants have the advantage that they are free from isocyanate groups, in particular from monomeric diisocyanates. Furthermore, they are distinguished by a broad range of adhesion to a wide variety of substrates without any surface pretreatment by primers.

Polymer systems having reactive silyl groups are therefore known in principle. In the presence of atmospheric moisture, polymers having silyl groups with hydrolyzable substituents are already capable of condensing with one another at room temperature, splitting off the hydrolyzed residues. Depending on the content of silyl groups with hydrolyzable substituents and the structure of these silyl groups, mainly long-chain polymers (thermoplastics), relatively wide-mesh, three-dimensional networks (elastomers) or highly crosslinked systems (thermosets) are formed during this process. The polymers generally have an organic backbone which carries e.g. alkoxysilyl or acyloxysilyl groups at the ends. The organic backbone can be for example polyurethanes, polyesters, polyethers etc.

Polymers with silyl groups at the ends or in a side chain are described for example in EP 1 396 513 A1. The silyl groups having hydrolyzable substituents are introduced, according to this document, by addition of a hydrosilane to terminal double bonds of the backbone polymer, by reaction of isocyanatosilanes with hydroxyl groups of the polymer, by reaction of silanes comprising active hydrogen atoms with isocyanate-functionalized polymers or by reaction of mercaptosilanes with terminal double bonds of the polymer. The polymers are a component of compositions which are used as adhesives or sealants.

EP 1 535 940 A1 also describes a method for producing crosslinkable materials, wherein in a first step organyloxysilyl-terminated polymers are produced by reaction of dihydroxy-terminated polymers with isocyanato-functional silanes and these are mixed in a second step with silane condensation catalyst and optionally other substances.

A curable composition based on silyl groups which can crosslink by siloxane bond formation is also provided by EP 1 930 376 A1, wherein as a further component an amine compound is mentioned as a silanol condensation catalyst.

A crosslinkable polymeric composition based on silane-terminated polymers having mixed oxyalkylene units in the polymer backbone is described in WO 2005/047394 A1.

Demands relating to the long-term temperature resistance of adhesives, sealants and coating compositions are becoming ever higher. The solar industry may be mentioned as an example. Thus, there is a continuing need for temperature-resistant compositions which are suitable for use as an adhesive, sealant and/or coating composition and which additionally have a series of other properties that are required in the area of application.

The object of the present invention is therefore to provide a curable composition which, from a toxicological viewpoint, is largely harmless in use, has good elasticity properties and a broad range of adhesion, and is distinguished in particular by very good long-term temperature stability after curing. In addition, the composition should also meet all other conventional requirements of a modern adhesive, sealant and/or coating composition.

Surprisingly, it has been shown that this object is achieved by the use of a specific combination of certain phenolic compounds in a composition based on silyl-terminated polymers. The invention therefore provides a curable composition, which at least comprises A) at least one polymer with at least one end group of the general formula (I)

$$-A_n-R-SiXYZ \quad (I),$$

where
A is a divalent linking group comprising at least one heteroatom,
R is a divalent hydrocarbon residue with 1-12 C atoms, and
X, Y, Z are substituents on the Si atom and are, independently of one another, $C_1$-$C_8$ alkyl, $C_1$-$C_8$ alkoxy or $C_1$-$C_8$ acyloxy groups, wherein at least one of the residues X, Y, Z is a $C_1$-$C_8$ alkoxy or $C_1$-$C_8$ acyloxy group, and
n is 0 or 1;

B) at least one compound of the general formula (II)

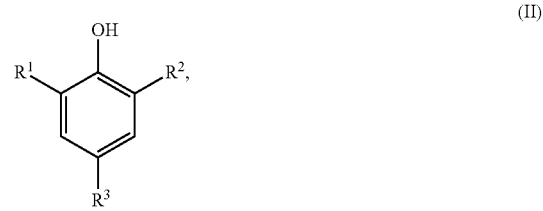

where
$R^1$, $R^2$ and $R^3$, independently of one another, are unsubstituted alkyl residues or organic residues comprising at least one heteroatom and encompassing at least 10 C atoms, wherein the residues $R^1$, $R^2$ and $R^3$ are free from thioether groups; and C) at least one compound of the general formula (III)

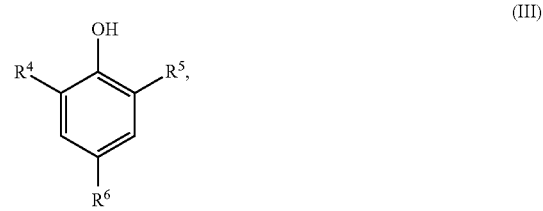

where
$R^4$, $R^5$ and $R^6$, independently of one another, are unsubstituted alkyl residues or linear alkyl residues comprising at least one thioether group, wherein at least one of the residues $R^4$, $R^5$ and $R^6$ is a linear alkyl residue comprising at least one thioether group.

A "composition" within the framework of the present invention is understood to be a mixture of at least two ingredients.

The term "curable" is to be understood as meaning that, under the influence of external conditions, in particular under the influence of moisture present in the environment and/or supplied for the purpose, the composition can pass from a relatively flexible state, optionally possessing plastic ductility, to a harder state. In general, the crosslinking can take place by means of chemical and/or physical influences, i.e. as well as the already mentioned moisture, for example, by the supply of energy in the form of heat, light or other electromagnetic radiation, but also by simply bringing the composition into contact with air or a reactive component.

The polymer of the general formula (I) with at least one end group mentioned in A) above is preferably a polyether or a poly(meth)acrylic acid ester.

A polyether is understood to be a polymer in which the organic repeating units comprise ether functionalities C—O—C in the main chain. Thus, the polyethers do not include polymers with lateral ether groups, such as e.g. the cellulose ethers, starch ethers and vinyl ether polymers. In general, polyacetals such as polyoxymethylene (POM) are likewise not included in the polyethers.

A poly(meth)acrylic acid ester is understood to be a polymer based on (meth)acrylic acid esters, which therefore has as a repeating unit the structural motif —$CH_2$—$CR^a$(COO$R^b$)—, where $R^a$ denotes a hydrogen atom (acrylic acid ester) or a methyl group (methacrylic acid ester) and $R^b$ denotes linear alkyl residues, branched alkyl residues, cyclic alkyl residues and/or alkyl residues comprising functional substituents, for example methyl, ethyl, isopropyl, cyclohexyl, 2-ethylhexyl or 2-hydroxyethyl residues.

The polymer of the general formula (I) with at least one end group is particularly preferably a polyether. Polyethers have a flexible and elastic structure, with which compositions having excellent elastic properties can be produced. Polyethers are not only flexible in their backbone, but at the same time strong. Thus, for example, polyethers are not attacked or decomposed by water and bacteria, unlike polyesters, for example.

The number average molecular weight $M_n$ of the polyether on which the polymer is preferably based is for preference 2,000 to 100,000 g/mol (daltons), the molecular weight particularly preferably being at least 6,000 g/mol and in particular at least 8,000 g/mol. Number average molecular weights of at least 2,000 g/mol are advantageous for the polyethers of the present invention, because compositions according to the invention based on polyethers with such a minimum molecular weight have significant film-forming properties. For example, the number average molecular weight $M_n$ of the polyether is 4,000 to 100,000, preferably 8,000 to 50,000, particularly preferably 10,000 to 30,000 and in particular 10,000 to 25,000 g/mol. These molecular weights are particularly advantageous, since the corresponding compositions have a balanced ratio of viscosity (ease of processing), strength and elasticity.

Particularly advantageous viscoelastic properties can be achieved if polyethers are used which have a narrow molar mass distribution and thus low polydispersity. These can be produced e.g. by so-called double metal cyanide catalysis (DMC catalysis). Polyethers produced in this way are distinguished by a particularly narrow molar mass distribution, by a high average molar mass and by a very low number of double bonds at the ends of the polymer chains.

In a special embodiment of the present invention, the maximum polydispersity $M_w/M_n$ of the polyether on which the polymer is based is therefore 3, particularly preferably 1.7 and most particularly preferably 1.5.

The molecular weight $M_n$ is understood to be the number average molecular weight of the polymer. Like the weight average molecular weight $M_w$, this is determined according to the invention by gel permeation chromatography (GPC, also: SEC) at 23° C. using a styrene standard. This method is known to the person skilled in the art. The polydispersity is derived from the average molecular weights $M_w$ and $M_n$. It is calculated as PD=$M_w/M_n$.

The ratio $M_w/M_n$ (polydispersity) expresses the width of the molar mass distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g. viscosity. In particular, therefore, within the framework of the present invention, the polyether on which the polymer A is based has a polydispersity ($M_w/M_n$) of less than 1.3.

The at least one polymer of the curable composition according to the invention has at least one end group of the general formula (I)

-$A_n$-R—SiXYZ        (I), where A is a divalent linking group comprising at least one heteroatom, R is a divalent hydrocarbon residue with 1-12 C atoms and X, Y, Z are substituents on the Si atom and are, independently of one another, $C_1$-$C_8$ alkyl, $C_1$-$C_8$ alkoxy or $C_1$-$C_8$ acyloxy groups, wherein at least one of the residues X, Y, Z is a $C_1$-$C_8$ alkoxy or $C_1$-$C_8$ acyloxy group, and n is 0 or 1.

In this context, the divalent or bivalent linking group A comprising at least one heteroatom is understood to be a divalent chemical group which links the polymer backbone of the alkoxysilane- and/or acyloxysilane-terminated polymer with the residue R of the end group. The divalent linking group A can be formed for example during the production of the alkoxysilane- and/or acyloxysilane-terminated polymer, for example as an amide or urethane group by the reaction of a polyether which is functionalized with hydroxy groups with an isocyanatosilane. The bivalent linking group can be either capable or incapable of being differentiated from structural features occurring in the underlying polymer backbone. The latter is the case, for example, if it is identical with the linking points of the repeating units of the polymer backbone.

The index "n" corresponds to 0 (zero) or 1, i.e. the divalent linking group A links the polymer backbone with the residue R (n=1) or the polymer backbone is bound or linked directly with the residue R (n=0).

The divalent linking group A in the general formula (I) is preferably an oxygen atom or an —NR'— group, where R' is an H atom or an alkyl or aryl residue with 1 to 12 C atoms, or the divalent linking group A comprises an amide, carbamate, urea, imino, carboxylate, carbamoyl, amidino, carbonate, sulfonate or sulfinate group. Particularly preferred as linking group A are urethane and urea groups, which can be obtained by reacting certain functional groups of a prepolymer with an organosilane which carries a further functional group. Urethane groups can be formed, for example, either when the polymer backbone comprises terminal hydroxy groups and isocyanatosilanes are used as a further component, or conversely when a polymer having terminal isocyanate groups is reacted with an alkoxysilane comprising terminal hydroxy groups. Similarly, urea groups can be obtained if a terminal primary or secondary amino group—either on the silane or on the polymer—is used, which reacts with a terminal isocyanate group that is present in the respective reactant. This means that either an aminosilane is reacted with a polymer having terminal isocyanate groups or a polymer that is terminally substituted with an amino group is reacted with an isocyanatosilane.

Urethane and urea groups advantageously increase the strength of the polymer chains and of the overall crosslinked polymer.

The residue R is a divalent hydrocarbon residue with 1 to 12 C atoms. The hydrocarbon residue can be a straight-chained, branched or cyclic alkylene residue. The hydrocarbon residue can be saturated or unsaturated. R is preferably a divalent hydrocarbon residue with 1 to 6 C atoms. The curing rate of the composition can be influenced by the length of the hydrocarbon residues which form one of the binding links or the binding link between polymer backbone and silyl residue. Particularly preferably, R is a methylene, ethylene or n-propylene group, in particular a methylene or n-propylene residue.

Alkoxysilane-terminated compounds with a methylene group as binding link to the polymer backbone—so-called α-silanes—have a particularly high reactivity of the terminating silyl group, leading to reduced setting times and thus to very rapid curing of formulations based on these polymers.

In general, a lengthening of the binding hydrocarbon chain leads to reduced reactivity of the polymers. In particular the γ-silanes—which comprise the unbranched propylene residue as binding link—have a balanced ratio between necessary reactivity (acceptable curing times) and delayed curing (open assembly time, possibility of corrections after bonding). By carefully combining α- and γ-alkoxysilane-terminated building blocks, therefore, the curing rate of the systems can be influenced as desired.

Within the framework of the present invention, R is most particularly preferably a methylene group, since the thus increased reactivity of the terminal silyl groups means that there is no need for a curing catalyst, which could be restricted in its effectiveness by the sulfurous component C).

The substituents X, Y and Z which are directly bound with the Si atom are, independently of one another, $C_1$-$C_8$ alkyl residues, $C_1$-$C_8$ alkoxy residues or $C_1$-$C_8$ acyloxy residues. At least one of the residues X, Y, Z here must be a hydrolyzable group, i.e. a $C_1$-$C_8$ alkoxy residue or a $C_1$-$C_8$ acyloxy residue. As hydrolyzable groups, preferably alkoxy groups, in particular methoxy, ethoxy, i-propyloxy and i-butyloxy groups, are selected. This is advantageous, since no substances which irritate mucous membranes are released during the curing of compositions comprising alkoxy groups. The alcohols formed by hydrolysis of the residues are harmless in the quantities released, and evaporate. These compositions are therefore suitable in particular for the DIY sector. However, acyloxy groups, such as e.g. an acetoxy group —O—CO—$CH_3$, can also be used as hydrolyzable groups.

The alkoxy- and/or acyloxysilane-terminated polymer(s) preferably has/have at least two end groups of the general formula (I). Each polymer chain thus comprises at least two linking points at which the condensation of the polymers can be completed, splitting off the hydrolyzed residues in the presence of atmospheric moisture. In this way, regular and rapid crosslinkability is achieved so that bonds with good strengths can be obtained. In addition, by means of the quantity and the structure of the hydrolyzable groups—for example by using di- or trialkoxysilyl groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way.

X is preferably an alkyl group and Y and Z are, each independently of one another, an alkoxy group, or X, Y and Z are, each independently of one another, an alkoxy group. In general, polymers comprising di- or trialkoxysilyl groups have highly reactive linking points which permit rapid curing, high degrees of crosslinking and thus good final strengths. The particular advantage of dialkoxysilyl groups lies in the fact that, after curing, the corresponding compositions are more elastic, softer and more flexible than systems comprising trialkoxysilyl groups. They are therefore suitable in particular for use as sealants. In addition, they split off even less alcohol during curing and are therefore of particular interest when the quantity of alcohol released is to be reduced.

With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have advantages in "cold flow"—the dimensional stability of a corresponding adhesive under the influence of force and possibly temperature.

Particularly preferably, the residues X, Y and Z in the general formula (I) are, each independently of one another, a methyl, an ethyl, a methoxy or an ethoxy group, at least one of the residues being a methoxy or ethoxy group. Methoxy and ethoxy groups as comparatively small hydrolyzable groups with low steric bulk are very reactive and thus permit a rapid cure, even with low use of catalyst. They are therefore of particular interest for systems in which rapid curing is desirable, such as for example in adhesives with which high initial adhesion is required.

Particularly preferably, X, Y and Z, each independently of one another, are a methyl or a methoxy group, at least one of the residues being a methoxy group. Compounds with alkoxysilyl groups, depending on the nature of the alkyl residues on the oxygen atom, have different reactivities in chemical reactions. Among the alkoxy groups, the methoxy group has the highest reactivity. This type of silyl groups can therefore be used if particularly rapid curing is desired. Higher aliphatic residues, such as ethoxy, already bring about lower reactivity of the terminal alkoxysilyl group compared with methoxy groups and can be used advantageously to implement graduated crosslinking rates.

Interesting configuration possibilities are also opened up by combinations of the two groups. If, for example, methoxy is selected for X and ethoxy for Y within the same alkoxysilyl group, the desired reactivity of the terminating silyl groups can be adjusted particularly finely if silyl groups carrying exclusively methoxy groups are deemed too reactive and silyl groups carrying ethoxy groups not reactive enough for the intended use.

In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

The total proportion of the polymers with at least one end group of the general formula (I) in the composition according to the invention is preferably 10 to 60 wt. %, particularly preferably 15 to 50 wt. %, for example 20 to 45 wt. %, in particular 25 to 40 wt. %, based in each case on the total weight of the curable composition.

The curable composition according to the invention comprises as an additional component at least one compound of the general formula (II)

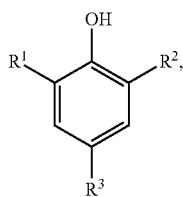

where
$R^1$, $R^2$ and $R^3$, independently of one another, are unsubstituted alkyl residues or organic residues comprising at least one heteroatom and encompassing at least 10 C atoms, wherein the residues $R^1$, $R^2$ and $R^3$ are free from thioether groups. According to the invention, unsubstituted alkyl residues are preferably alkyl residues with 1 to 6 C atoms, particularly preferably methyl, ethyl, i-propyl, i-butyl and tert-butyl residues, in particular methyl and tert-butyl residues. Preferably, at least one of the residues $R^1$, $R^2$ and $R^3$ is an organic residue comprising at least one heteroatom and encompassing at least 10 C atoms. Preferred as organic residues comprising at least one heteroatom and encompassing at least 10 C atoms are residues having at least one substituted or unsubstituted hydroxyphenyl group; for example residues with several aromatic groups, which are bound together by alkylene bridges, wherein at least one of these aromatic groups is a substituted or unsubstituted hydroxyphenyl group. A preferred compound corresponding to the general formula (II), which comprises such a residue, is e.g. 3,3',3",5,5',5"-hexa-tert-butyl-α,α',α"-(mesitylene-2,4,6,-triyl)tri-p-cresol, which is commercially available with the name "Irganox® 1330".

Likewise preferred as a compound of the general formula (II) is a compound of the formula (IV)

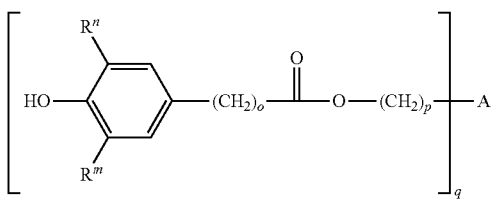

where $R^n$ and $R^m$, independently of one another, are unsubstituted alkyl residues, wherein at least one of the residues $R^n$ and $R^m$ comprises at least four C atoms; o and p independently of one another are integers from 1 to 8; q is an integer from 2 to 4 and A is a q-valent organic residue with 1 to 4 C atoms.

Particularly preferably, at least one of the residues $R^n$ and $R^m$ is a tert-butyl residue, o is 2 and p is 1 or 2, q is 2 or 4 and A is an —O—(CH$_2$)$_2$—O— group for q=2 and a C atom for q=4. These particularly preferred compounds according to the invention are commercially available, e.g. with the names "Irganox® 245" and "Irganox® 1010".

The curable composition according to the invention further comprises at least one compound of the general formula (III)

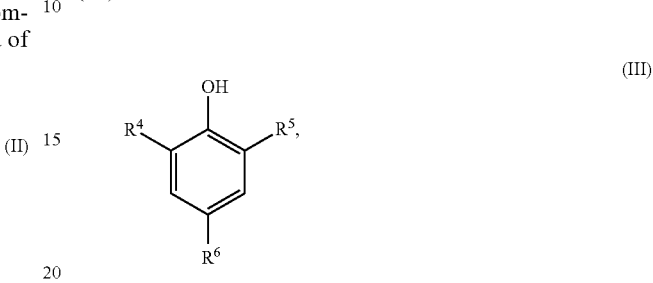

where
$R^4$, $R^5$ and $R^6$, independently of one another, are unsubstituted alkyl residues or linear alkyl residues comprising at least one thioether group, wherein at least one of the residues $R^4$, $R^5$ and $R^6$ is a linear alkyl residue comprising at least one thioether group. Preferred unsubstituted alkyl residues are alkyl residues with 1 to 6 C atoms, among which methyl, ethyl, i-propyl, i-butyl and tert-butyl residues, in particular methyl and tert-butyl residues, are particularly preferred.

A thioether group is understood to be a structural element of the general form —CR'R"—S—CR'"R""—, where R', R", R'" and R"" are H atoms or any hydrocarbon residues. The linear alkyl residues comprising at least one thioether group preferably have 6 to 18, particularly preferably 8 to 16, in particular 9 to 14 C atoms. Most particularly preferred residues are the —CH$_2$—S—C$_3$H$_{17}$ residue and the —CH$_2$—S—C$_{12}$H$_{25}$ residue.

Preferably, at least two of the residues $R^4$, $R^5$ and $R^6$ are each linear alkyl residues comprising at least one thioether group. Accordingly, among the compounds of the general formula (III), compounds of the formula (V)

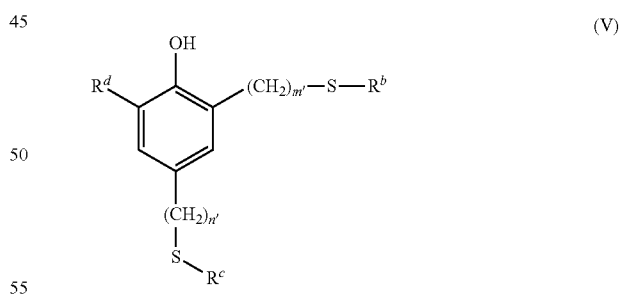

are preferred according to the invention, where $R^d$ is an unsubstituted alkyl residue with 1 to 8 C atoms, $R^b$ and $R^c$, independently of one another, are linear alkyl residues with 1 to 20 C atoms and n' and m', independently of one another, are integers from 1 to 8. Particularly preferably, $R^d$ is a methyl, ethyl or i-propyl group, n' and m' are 1 and $R^b$ and $R^c$ each have 8 to 12 C atoms, with $R^b$ and $R^c$ comprising the same number of C atoms.

It has been shown that, when using a specific combination of at least one compound of the general formula (II) and at least one compound of the general formula (III), a synergistic effect of these components occurs, which results in the curable compositions according to the invention having an improved long-term temperature resistance.

The proportion of compounds of the general formulae (II) and (III) in the curable composition according to the invention is preferably in each case 0.05 to 5 wt. %, particularly preferably in each case 0.1 to 2 wt. % and in particular in each case 0.15 to 1 wt. %, for example in each case 0.2 to 0.5 wt. %. The weight ratio of the compounds of the general formulae (II) and (III) used in the curable composition according to the invention is preferably 3:1 to 1:3, more preferably 2:1 to 1:2 and particularly preferably 1.5:1 to 1:1.5.

The composition according to the invention can comprise further ingredients in addition to the components mentioned hitherto, which can contribute to the expression of desired properties. Thus, it may be necessary to add one or more plasticizers to adjust the elastic properties and to improve the processability of the composition. A plasticizer is understood to be a substance which reduces the viscosity of the composition and thus makes processing easier, and in addition improves flexibility and extensibility of the compositions.

The plasticizer is preferably selected from a fatty acid ester, a dicarboxylic acid ester (except cyclohexanedicarboxylic acid dialkyl ester), an ester of epoxidized fatty acids or fatty acids carrying OH groups, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer and a chlorinated paraffin, and mixtures of two or more thereof. By the careful selection of one of these plasticizers or of a specific combination, further advantageous properties of the composition according to the invention, for example gelling properties of the polymers, low-temperature elasticity or low-temperature resistance or antistatic properties, can be achieved.

Among the polyether plasticizers, preferably end-capped polyethylene glycols are used, for example polyethylene or polypropylene glycol di-$C_{1-4}$-alkyl ethers, in particular the dimethyl or diethyl ethers of diethylene glycol or dipropylene glycol, and mixtures of two or more thereof. Also suitable as plasticizers are, for example, esters of abietic acid, butyric acid ester, acetic acid ester, propionic acid ester, thiobutyric acid ester, citric acid ester and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Düsseldorf). In addition, the pure or mixed ethers of monofunctional, linear or branched $C_{4-16}$ alcohols or mixtures of two or more different ethers of such alcohols are suitable as plasticizers, for example dioctyl ether (available as Cetiol OE, Cognis Deutschland GmbH, Düsseldorf). Likewise suitable as plasticizers within the framework of the present invention are diurethanes, which can be produced e.g. by reaction of diols having OH end groups with monofunctional isocyanates, by selecting the stoichiometry so that substantially all free OH groups react fully. Any excess isocyanate can then be removed from the reaction mixture, e.g. by distillation. Another method for producing diurethanes consists in the reaction of monofunctional alcohols with diisocyanates, wherein as far as possible all NCO groups react fully.

In principle, phthalic acid esters can also be used as plasticizers, but because of their toxicological potential these are not preferred.

The total quantity of plasticizer(s) in curable compositions according to the invention is for preference 1 to 30, wt. %, preferably 5 to 25 wt. % and particularly preferably 10 to 20 wt. %, based in each case on the total weight of the curable composition.

Too high a viscosity of the composition according to the invention for certain applications can also be reduced in a simple and useful manner by using a reactive diluent, without signs of separation (e.g. plasticizer migration) appearing in the cured material. The reactive diluent preferably has at least one functional group which reacts with e.g. moisture or atmospheric oxygen after application. Examples of these groups are silyl groups, isocyanate groups, vinylically unsaturated groups and polyunsaturated systems. As reactive diluent, it is possible to use any compounds which are miscible with the composition according to the invention with a reduction of the viscosity and have at least one group that is reactive with the binder, individually or as a combination of several compounds. The viscosity of the reactive diluent is preferably less than 20,000 mPas, particularly preferably about 0.1-6000 mPas, most particularly preferably 1-1000 mPas (Brookfield RVT, 23° C., spindle 7, 10 rpm).

As reactive diluents it is possible to use for example the following substances: polyalkylene glycols reacted with isocyanatosilanes (for example Synalox 100-50B, DOW), alkyltrimethoxysilane, alkyltriethoxysilane, such as methyltrimethoxysilane, methyltriethoxysilane and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methylcarbamate (XL63, Wacker), N-dimethoxy(methyl)silylmethyl-O-methylcarbamate (XL65, Wacker), hexadecyltrimethoxysilane, 3-octanoylthio-1-propyltriethoxysilane and partial hydrolyzates of these compounds. Furthermore, the following polymers from Kaneka Corp. can also be used as reactive diluents: MS S203H, MS S303H, MS SAT 010 and MS SAX 350. Also suitable as reactive diluents are polymers which can be produced from an organic backbone by grafting with a vinylsilane or by reaction of polyol, polyisocyanate and alkoxysilane.

A polyol is understood to be a compound which comprises one or more OH groups in the molecule. The OH groups can be both primary and secondary.

Suitable aliphatic alcohols include, for example, ethylene glycol, propylene glycol and higher glycols, as well as other polyfunctional alcohols. The polyols can additionally comprise other functional groups, such as e.g. esters, carbonates, amides. To produce a reactive diluent by reaction of polyol with polyisocyanate and alkoxysilane, the corresponding polyol component is reacted in each case with an at least difunctional isocyanate. Suitable as the at least difunctional isocyanate is in principle any isocyanate having at least two isocyanate groups, but within the framework of the present invention, compounds having two to four isocyanate groups, in particular two isocyanate groups, are generally preferred. Among the alkoxysilyl groups, the di- and trialkoxysilyl groups are preferred.

Suitable as polyisocyanates for producing a reactive diluent are e.g. ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis(2-isocyanatoethyl) fumarate and mixtures of two or more thereof, 1-isocyanato-3,3,5-trimethyl-5-isocyanatomethylcyclohexane (isophorone diisocyanate, IPDI), 2,4- and 2,6-hexahydrotoluene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluene diisocyanate (TDI), 2,4'-diphenylmethane diisocyanate, 2,2'-diphenylmethane diisocyanate or 4,4'-diphenylmethane diisocyanate (MDI) or partially or completely hydrogenated cycloalkyl derivatives thereof, for example completely hydrogenated MDI (H12-MDI), alkyl-substituted diphenylmethane diisocyanates, for example mono-, di-, tri- or tetraalkyl diphenylmethane diisocyanate and partially or completely hydrogenated cycloalkyl derivatives thereof, 4,4'-d iisocyanatophenyl perfluoroethane, phthalic acid bisisocyanatoethyl ester, 1-chloromethylphenyl 2,4- or 2,6-diisocyanate, 1-bromomethylphenyl 2,4- or 2,6-diisocyanate, 3,3-bischloromethyl ether 4,4'-diphenyl diisocyanate, sulfurous diisocyanates, as can be obtained by reaction of 2 mol diisocyanate with 1 mol thiodiglycol or dihydroxydihexyl sulfide, the di- and triisocyanates of dimer and trimer fatty acids or mixtures of two or more of the above diisocyanates.

Likewise, trivalent or polyvalent isocyanates, as can be obtained for example by oligomerization of diisocyanates, in particular by oligomerization of the above-mentioned isocyanates, can be used as polyisocyanates. Examples of these trivalent and polyvalent polyisocyanates are the triisocyanurates of HDI or IPDI or mixtures thereof or mixed triisocyanurates thereof and polyphenyl methylene polyisocyanate, as can be obtained by phosgenation of anilineformaldehyde condensation products.

To reduce the viscosity of the composition according to the invention, solvents can also be used as well as or instead of a reactive diluent. Suitable as solvents are aliphatic or aromatic hydrocarbons, halogenated hydrocarbons, alcohols, ketones, ethers, esters, ester alcohols, keto alcohols, keto ethers, keto esters and ether esters. Preferably, however, alcohols are used since in this case the storage stability increases. $C_1$-$C_{10}$ alcohols are particularly preferred, particularly methanol, ethanol, i-propanol, isoamyl alcohol and hexanol.

The composition according to the invention can additionally comprise an adhesion promoter. An adhesion promoter is understood to be a substance which improves the adhesion properties of adhesive layers on surfaces. It is possible to use conventional adhesion promoters known to the person skilled in the art (tackifiers) individually or as a combination of several compounds. Suitable examples are resins, terpene oligomers, coumarone/indene resins, aliphatic, petrochemical resins and modified phenolic resins. Suitable within the framework of the present invention are, for example, hydrocarbon resins, as obtained by polymerization of terpenes, principally α- or β-pinene, dipentene or limonene. The polymerization of these monomers generally takes place cationically with initiation by Friedel-Crafts catalysts. The terpene resins also include copolymers of terpenes and other monomers, e.g. styrene, α-methylstyrene, isoprene and the like. The above resins are used e.g. as adhesion promoters for pressure-sensitive adhesives and coating materials. Also suitable are the terpene-phenolic resins which are produced by acid-catalyzed addition of phenols to terpenes or rosin. Terpene-phenolic resins are soluble in most organic solvents and oils and are miscible with other resins, waxes and rubber. Likewise within the framework of the present invention, the rosins and derivatives thereof, for example their esters or alcohols, are suitable as adhesion promoters in the above sense. Silane adhesion promoters, in particular aminosilanes, are particularly suitable.

In a special embodiment of the curable composition according to the invention, the composition encompasses a silane of the general formula (VI)

$$R^{1'}R^{2'}N-R^{3'}-SiXYZ \qquad (VI)$$

as adhesion promoter, where
$R^{1'}$ and $R^{2'}$, independently of one another, are hydrogen or $C_1$-$C_8$ alkyl residues,
$R^{3'}$ is a divalent hydrocarbon residue with 1-12 C atoms, optionally comprising a heteroatom, and
X, Y, Z, each independently of one another, are $C_1$-$C_8$ alkyl, $C_1$-$C_8$ alkoxy or $C_1$-$C_8$ acyloxy residues, at least one of the residues X, Y, Z being a $C_1$-$C_8$ alkoxy or $C_1$-$C_8$ acyloxy group. Compounds of this type naturally exhibit a high affinity to the binding polymer components of the curable composition according to the invention, but also to a wide range of polar and nonpolar surfaces, and therefore contribute to the formation of a particularly stable bond between the adhesive composition and the particular substrates to be bonded.

The linking group $R^{3'}$ can, for example, be a straight-chained or branched or cyclic, substituted or unsubstituted alkylene residue. Nitrogen (N) or oxygen (O) may be contained therein as a heteroatom. If X, Y and/or Z are an acyloxy group, this can be e.g. the acetoxy group —OCO—$CH_3$.

One or more adhesion promoter(s) is/are preferably contained in the curable composition according to the invention in a quantity of 0.1 to 5 wt. %, more preferably 0.2 to 2 wt. %, in particular 0.3 to 1 wt. %, based in each case on the total weight of the composition.

Suitable as fillers for the composition according to the invention are e.g. chalk, powdered limestone, precipitated and/or pyrogenic silica, zeolites, bentonites, magnesium carbonate, kieselguhr, alumina, clay, tallow, titanium oxide, iron oxide, zinc oxide, sand, quartz, flint, mica, powdered glass and other ground minerals. Furthermore, organic fillers can also be used, in particular carbon black, graphite, wood fibers, wood flour, sawdust, cellulose, cotton, pulp, wood chips, chopped straw, chaff, ground walnut shells and other short-cut fibers. Furthermore, short fibers such as glass fibers, glass filament, polyacrylonitrile, carbon fibers, Kevlar fibers or polyethylene fibers can also be added. Aluminum powder is also suitable as a filler. In addition, hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®. These are composed of inorganic or organic substances, each with a diameter of 1 mm or less, preferably of 500 μm or less. For some applications, fillers which make the preparations thixotropic are preferred. These fillers are also described as rheological auxiliaries, for example hydrogenated castor oil, fatty acid amides or swellable plastics such as PVC. So that they can easily be squeezed out of a suitable metering device (e.g. tube), these preparations possess a viscosity of 3,000 to 15,000, preferably 4,000 to 8,000 mPas or 5,000 to 6,000 mPas. The fillers are preferably used in a quantity of 10 to 70 wt. %, more preferably 20 to 60 wt. %, for example 25 to 55 wt. %, in particular 35 to 50 wt. %, based on the total weight of the composition according to the invention. An individual filler or a combination of several fillers can be used.

For example, a highly disperse silica with a BET surface area of 10 to 500 $m^2$/g is used as a filler. The use of such a silica does not bring about a substantial increase in the viscosity of the composition according to the invention but contributes to reinforcing the hardened preparation. By means of this reinforcement, for example the initial strengths, tensile shear strengths and the adhesion of the adhesives, sealants or coating compositions in which the composition according to the invention is used are improved. Preferably, uncoated silicas with a BET surface area of less than 100, more preferably less than 65 $m^2$/g, and/or coated silicas with a BET surface area of 100 to 400, more preferably 100 to 300, in particular 150 to 300 and most particularly preferably 200 to 300 $m^2$/g, are used.

As zeolites, preferably alkali aluminosilicates are used, for example sodium-potassium aluminosilicates of the general empirical formula aK$_2$O*bNa$_2$O*Al$_2$O$_3$*2SiO*nH$_2$O with 0<a, b<1 and a+b=1. The pore opening of the zeolite or zeolites used is just large enough to accept water molecules. Accordingly, an effective pore opening of the zeolites of less than 0.4 nm is preferred. Particularly preferably, the effective pore opening is 0.3 nm±0.02 nm. The zeolite(s) is/are preferably used in the form of a powder.

Chalk is preferably used as a filler. Cubic, non-cubic, amorphous and other modifications of calcium carbonate can be used as chalk. Preferably, the chalks used are surface treated or coated. As a coating agent, preferably fatty acids, fatty acid soaps and fatty acid esters are used, for example lauric acid, palmitic acid or stearic acid, sodium or potassium salts of such acids or their alkyl esters. In addition, however, other surface-active substances, such as sulfate esters of long-chain alcohols or alkylbenzenesulfonic acids or their sodium or potassium salts or coupling reagents based on silanes or titanates, are also suitable. The surface treatment of chalks is often associated with an improvement in processability and adhesive strength and also the weathering resistance of the compositions. The coating composition is usually used in a proportion of 0.1 to 20 wt %, preferably 1 to 5 wt %, based on the total weight of the crude chalk.

Depending on the desired property profile, precipitated or ground chalks or mixtures thereof can be used. Ground chalks can be produced, for example, from natural lime, limestone or marble by mechanical grinding, using either dry or wet methods. Depending on the grinding method, fractions having different average particle sizes can be obtained. Advantageous specific surface area values (BET) are between 1.5 m$^2$/g and 50 m$^2$/g.

The composition according to the invention can additionally comprise UV stabilizers. Preferably, the proportion of the UV stabilizers in the composition according to the invention is up to about 2 wt. %, in particular up to 1 wt. %. Particularly suitable as UV stabilizers are the so-called hindered amine light stabilizers (HALS). For example, a UV stabilizer can be used which carries a silyl group and is incorporated into the end product during crosslinking or curing. Furthermore, benzotriazoles, benzophenones, benzoates, cyanoacrylates, acrylates, sterically hindered phenols, phosphorus and/or sulfur can also be added. The curable composition according to the invention preferably comprises at least one bis(piperidyl) dicarboxylic acid diester, for example bis(2,2,6,6-tetramethyl-4-piperidyl) sebacate.

It is often useful to stabilize the composition according to the invention further against moisture penetration in order to increase the shelf life even more. Such an improvement in shelf life can be achieved, for example, by the use of drying agents. Suitable as drying agent are all compounds that react with water to form a group that is inert towards the reactive groups present in the composition while undergoing the smallest possible changes in their molecular weight. Furthermore, the reactivity of the drying agents towards moisture that has penetrated into the composition must be higher than the reactivity of the end groups of the silyl group-containing polymer according to the invention present in the composition. Isocyanates, for example, are suitable as drying agent.

Advantageously, silanes are also used as drying agent, e.g. vinylsilanes such as 3-vinylpropyltriethoxysilane, oxime silanes such as methyl-O,O',O"-butan-2-one trioximosilane or O,O',O",O'"-butan-2-one tetraoximosilane (CAS no. 022984-54-9 and 034206-40-1) or benzamidosilanes such as bis(N-methylbenzamido)methylethoxysilane (CAS no. 16230-35-6) or carbamatosilanes such as carbamatomethyltrimethoxysilane. However, the use of methyl-, ethyl- or vinyltrimethoxysilane, tetramethyl- or tetraethylethoxysilane is also possible. Particularly preferred here are vinyltrimethoxysilane and tetraethoxysilane in terms of efficiency and costs. Also suitable as drying agent are the abovementioned reactive diluents, provided that they have a molecular weight (M$_n$) of less than about 5,000 g/mol and terminal groups whose reactivity with penetrating moisture is at least as great as, preferably greater than, the reactivity of the reactive groups of the silyl group-containing polymer according to the invention. Finally, alkyl orthoformates or orthoacetates can also be used as drying agent, for example methyl or ethyl orthoformate or methyl or ethyl orthoacetate. Generally, the composition according to the invention preferably comprises 0.01 to 10 wt. % drying agent, based on the total weight of the composition.

The curable composition according to the invention preferably comprises the following components in the stated proportions by weight:

| | |
|---|---|
| at least one polymer with at least one end group of the general formula (I) | 10-60 wt. %, |
| at least one compound of the general formula (II) | 0.05-5 wt. %, |
| at least one compound of the general formula (III) | 0.05-5 wt. %, |
| one or more filler(s) | 10-70 wt. %, |
| one or more plasticizer(s) | 1 to 30 wt. %, |
| one or more auxiliary substance(s) | 0-15 wt. %, | wherein the proportions by weight add up to 100 wt. % and the proportions by weight are based on the total weight of the curable composition.

The term "auxiliary substances" covers components that are present in minor quantities, for example curing catalysts, adhesion promoters, water scavengers, UV stabilizers, anti-ageing agents, rheological auxiliaries, pigments or pigment pastes, fungicides, flame retardants and/or solvents.

With regard to the preferred representatives of the individual components and the preferably used quantities thereof, the statements made above in the description of the respective components apply.

The production of the composition according to the invention takes place by known methods by intimate mixing of the components in suitable dispersing apparatus, for example a high-speed mixer.

The present invention also provides the use of the curable composition according to the invention as an adhesive, sealant and/or coating composition.

The present invention also provides the use of a combination of at least one compound of the general formula (II)

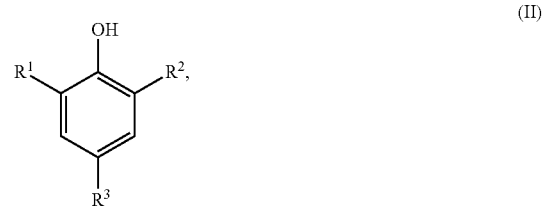

where

R$^1$, R$^2$ and R$^3$, independently of one another, are unsubstituted alkyl residues or organic residues comprising at least one heteroatom and encompassing at least 10 C atoms, wherein the residues R$^1$, R$^2$ and R$^3$ are free from thioether groups, with at least one compound of the general formula (III)

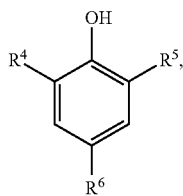

(III)

where
R⁴, R⁵ and R⁶, independently of one another, are unsubstituted alkyl residues or linear alkyl residues comprising at least one thioether group, wherein at least one of the residues R⁴, R⁵ and R⁶ is a linear alkyl residue comprising at least one thioether group, to increase the temperature stability in curable compositions. With regard to preferably used compounds of the general formulae (II) and (III), the statements made above in the description of the compositions according to the invention apply accordingly.

In principle, in the present invention, all features mentioned in the context of the present text, in particular the embodiments, ranges of proportions, components and other features of the composition according to the invention and of the uses according to the invention shown as preferred and/or special can be implemented in all possible and not mutually exclusive combinations, with combinations of features shown as preferred and/or special also being regarded as preferred and/or special.

EXAMPLES

Compositions according to Tables 1 and 2 were produced in a Speedmixer by mixing the ingredients listed there.

From the compositions, S2 specimens were produced. These were subjected to storage for 42 or 84 days in a standard atmosphere (23° C., 50% relative humidity) or at 100° C. in a circulating air oven with air exchange according to the tables, with storage at 100° C. simulating long-term storage.

After the storage (after storage at 100° C., 1 d reconditioning in a standard atmosphere), measurements were performed to determine the 50% and 100% modulus respectively and the tear strength, using a tensile testing machine. Specimens are considered to have long-term temperature stability if the maximum percentage deviation of their elasticity values after storage under the different conditions stated in each case is ±20%.

TABLE 1

Compositions and results

| Composition (data in wt. %) | 1 (inv.) | 2 (inv.) | 3 (cp.) | 4 (cp.) |
|---|---|---|---|---|
| Polymer (STP-E 10, Wacker) | 33.2 | 33.2 | 33.2 | 33.2 |
| Plasticizer (Mesamoll ®, Lanxess) | 15.3 | 15.3 | 15.3 | 15.3 |
| Filler (coated, precipitated chalk) | 47.6 | 47.6 | 47.6 | 47.6 |
| Irganox ® 245 | 0.3 | 0.3 | | 0.3 |
| Irganox ® 1520 | 0.3 | 0.3 | 0.3 | |
| Tinuvin ® 770 | 0.3 | | 0.3 | |
| Auxiliaries | 3 | 3.3 | 3.3 | 3.6 |
| Total | 100 | 100 | 100 | 100 |
| Test results after 42 d (standard atmosphere) | | | | |
| 50% Modulus (N/mm²) | 1.28 | 1.27 | 1.25 | 1.27 |
| 100% Modulus (N/mm²) | 2.0 | 2.01 | 1.96 | 1.99 |
| Tear strength (N/mm²) | 3.32 | 3.29 | 2.99 | 3.18 |
| Test results after 84 d (100° C.) | | | | |
| 50% Modulus (N/mm²) | 1.05 | 1.03 | 0.24 | 0.75 |
| 100% Modulus (N/mm²) | 1.77 | 1.7 | 0.45 | 1.33 |
| Tear strength (N/mm²) | 2.67 | 2.79 | 1.19 | 2.41 |
| Change comparing 84 d v. 42 d (%) | | | | |
| 50% Modulus (N/mm²) | −18 | −19 | −81 | −41 |
| 100% Modulus (N/mm²) | −12 | −15 | −77 | −33 |
| Tear strength (N/mm²) | −20 | −15 | −70 | −24 | inv. = according to the invention
cp. = comparative test

TABLE 2

Compositions and results

| Composition (data in wt. %) | 3 (inv.) | 4 (inv.) | 5 (inv.) | 6 (cp.) |
|---|---|---|---|---|
| Polymer (STP-E 10, Wacker) | 33.2 | 33.2 | 33.2 | 33.2 |
| Plasticizer (Mesamoll ®, Lanxess) | 15.3 | 15.3 | 15.0 | 15.3 |
| Filler (coated, precipitated chalk) | 39.6 | 39.6 | 39.6 | 39.6 |
| Irganox ® 245 | 0.3 | | 0.3 | 0.3 |
| Irganox ® 1010 | | | | 0.3 |
| Irganox ® 1330 | | 0.3 | | |
| Irganox ® 1520 | 0.3 | 0.3 | 0.3 | |
| Tinuvin ® 770 | 0.3 | 0.3 | 0.3 | 0.3 |
| Auxiliaries | 11 | 11 | 11.3 | 11 |
| Total | 100 | 100 | 100 | 100 |
| Test results after 84 d (standard atmosphere) | | | | |
| 50% Modulus (N/mm²) | 1.20 | 1.19 | 1.22 | 1.20 |
| 100% Modulus (N/mm²) | 1.96 | 1.96 | 1.99 | 1.96 |
| Tear strength (N/mm²) | 3.40 | 3.30 | 3.32 | 3.17 |
| Test results after 42 d (100° C.) | | | | |
| 50% Modulus (N/mm²) | 1.02 | 0.95 | 1.01 | 0.73 |
| 100% Modulus (N/mm²) | 1.73 | 1.62 | 1.71 | 1.31 |
| Tear strength (N/mm²) | 3.35 | 3.30 | 3.31 | 2.86 |
| Change comparing 42 d v. 84 d (%) | | | | |
| 50% Modulus (N/mm²) | −15 | −20 | −17 | −39 |
| 100% Modulus (N/mm²) | −12 | −17 | −14 | −33 |
| Tear strength (N/mm²) | −1 | 0 | 0 | −10 | inv. = according to the invention
cp. = comparative test

The test results show that the deviation from the initial value after long-term storage is no more than 20% throughout for the compositions according to the invention, while significantly higher deviations occur for compositions that are not according to the invention. From a comparison of compositions 3, 4 and 5 with composition 6, it becomes clear that a combination of two similar stabilizers (Irganox® 245, Irganox® 1010, example 6 which is not according to the invention) does not bring about the synergistic effect in terms of long-term temperature stability, in contrast to the combination of compounds of the general formula (II) and compounds of the general formula (III) according to the invention (Examples 3, 4 and 5 according to the invention).

What is claimed is:

1. A curable composition, at least comprising
A) at least one polymer with at least one end group of the general formula (I)

-An-R—SiXYZ  (I), where
A is a divalent linking group comprising at least one heteroatom,
R is a divalent hydrocarbon residue with 1-12 C atoms, and
X, Y, Z are substituents on the Si atom and are, independently of one another, $C_1$-$C_8$ alkyl, $C_1$-$C_8$ alkoxy or $C_1$-$C_8$ acyloxy groups, wherein at least one of the residues X, Y, Z is a $C_1$-$C_8$ alkoxy or $C_1$-$C_8$ acyloxy group, and
n is 0 or 1, wherein the A) at least one polymer is a polyether or a poly(meth)acrylic acid ester;
B) at least one compound of the general formula (II)

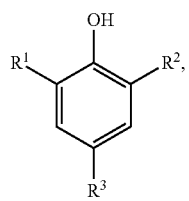

(II)

where
$R^1$, $R^2$ and $R^3$ independently of one another are unsubstituted alkyl residues or organic residues comprising at least one heteroatom and encompassing at least 10 C atoms, wherein the residues $R^1$, $R^2$ and $R^3$ are free from thioether groups; and
C) at least one compound of the general formula (III)

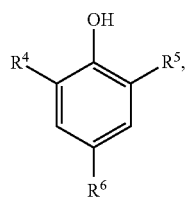

(III)

where
$R^4$, $R^5$ and $R^6$ independently of one another are unsubstituted alkyl residues or linear alkyl residues comprising at least one thioether group, wherein no more than two of the residues $R^4$, $R^5$ and $R^6$ is a linear alkyl residue comprising at least one thioether group; wherein the composition comprises the following components in the stated proportions by weight:

| | |
|---|---|
| at least one polymer with at least one end group of the general formula (I) | 10-60 wt. %, |
| at least one compound of the general formula (II) | 0.05-5 wt. %, |
| at least one compound of the general formula (III) | 0.05-5 wt. %, |
| one or more filler(s) | 10-70 wt. %, |
| one or more plasticizers | 1 to 30 wt. %, |
| one or more auxiliary substance(s) | 0-10 wt. %, | wherein the auxiliary substance(s) are free of curing catalysts,
wherein the composition is free of fatty acid amides as a thixotrope and the proportions by weight add up to 100 wt. % and the proportions by weight are based on the total weight of the curable composition.

2. The curable composition according to claim 1, wherein the divalent linking group A in the general formula (I) is an oxygen atom, an —NR'— group, where R' is an H atom or an alkyl or aryl residue with 1 to 12 C atoms, or an amide, carbamate, urea, imino, carboxylate, carbamoyl, amidino, carbonate, sulfonate or sulfinate group.

3. The curable composition according to claim 1, wherein the residues X, Y, Z in the general formula (I), each independently of one another, are a methyl, an ethyl, a methoxy or an ethoxy group, wherein at least one of the residues is a methoxy or ethoxy group.

4. The curable composition according to claim 1, wherein R in the general formula (I) is a methylene, ethylene or n-propylene group.

5. The curable composition according to claim 1, wherein the compound of the general formula (II) is a compound of the general formula (IV)

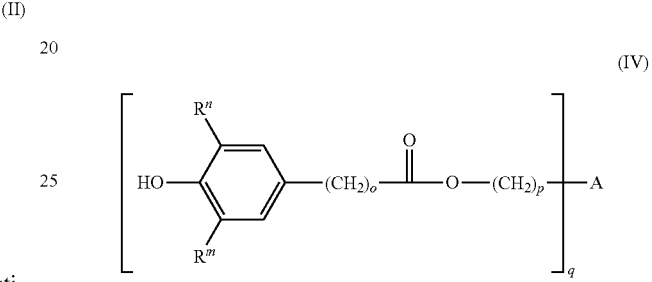

(IV)

where $R^n$ and $R^m$ independently of one another are unsubstituted alkyl residues, wherein at least one of the residues $R^n$ and $R^m$ comprises at least four C atoms; o and p independently of one another are integers from 1 to 8; q is an integer from 2 to 4 and A is a q-valent organic residue with 1 to 4 C atoms.

6. The curable composition according to claim 1, wherein at least two of the residues $R^4$, $R^5$ and $R^6$ are each linear alkyl residues comprising at least one thioether group.

7. An adhesive, sealant, and/or coating composition comprising a curable composition according to claim 1.

8. The curable composition according to claim 1, wherein the compound of the general formula (III) is a compound of the general formula (V)

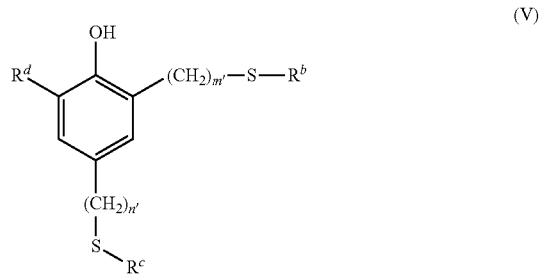

(V)

wherein $R^d$ is an unsubstituted alkyl residue with 1 to 8 C atoms;
$R^b$ and $R^c$, independently of one another, are linear alkyl residues with 1 to 20 C atoms; and,
n' and m', independently of one another, are integers from 1 to 8.

9. The curable composition according to claim 8, wherein $R^d$ is a methyl, ethyl or i-propyl group;

n' and m' are 1; and, $R^b$ and $R^c$ each have 8 to 12 C atoms, with $R^b$ and $R^c$ comprising the same number of C atoms.

10. The curable composition according to claim 1 comprising 5 to 25 wt. % of one or more plasticizers.

* * * * *